(12) United States Patent
Fujii et al.

(10) Patent No.: US 11,486,525 B2
(45) Date of Patent: Nov. 1, 2022

(54) RESIN TUBE FITTING

(71) Applicant: NIPPON PILLAR PACKING CO., LTD., Osaka (JP)

(72) Inventors: Makoto Fujii, Osaka (JP); Toshihide Iida, Osaka (JP); Tomoyuki Koike, Osaka (JP); Motoaki Naruo, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 190 days.

(21) Appl. No.: 16/475,312

(22) PCT Filed: Jan. 15, 2018

(86) PCT No.: PCT/JP2018/000798
§ 371 (c)(1),
(2) Date: Jul. 1, 2019

(87) PCT Pub. No.: WO2018/179678
PCT Pub. Date: Oct. 4, 2018

(65) Prior Publication Data
US 2019/0331272 A1    Oct. 31, 2019

(30) Foreign Application Priority Data

Mar. 30, 2017  (JP) .............. JP2017-066844

(51) Int. Cl.
*F16L 19/028*    (2006.01)
*F16L 19/04*     (2006.01)
(Continued)

(52) U.S. Cl.
CPC ........... *F16L 33/223* (2013.01); *F16L 19/028* (2013.01); *F16L 19/041* (2013.01); *F16L 47/041* (2019.08)

(58) Field of Classification Search
CPC ..... F16L 33/223; F16L 47/041; F16L 19/028; F16L 19/041; F16L 19/025; F16L 19/04;
(Continued)

(56) References Cited

U.S. PATENT DOCUMENTS 2,011,433 A * 8/1935 Blagg ................. F16L 19/041
5,505,464 A * 4/1996 McGarvey
(Continued)

FOREIGN PATENT DOCUMENTS

JP        2001-21074 A     1/2001
JP        2012-163132 A    8/2012
(Continued)

OTHER PUBLICATIONS

International Search Report dated Feb. 27, 2018 in PCT/JP2018/000798 filed on Jan. 15, 2018.
(Continued)

*Primary Examiner* — Zachary T Dragicevich
*Assistant Examiner* — William S. Choi
(74) *Attorney, Agent, or Firm* — Oblon, McClelland, Maier & Neustadt, L.L.P.

(57) ABSTRACT

A resin tube fitting prevents backwaters between its body and inner ring. The fitting includes a body, an inner ring, and a union nut. The body has main, outer, and inner sleeves, and a groove. The inner ring has a cylinder, an insert, and outer and inner protrusions. The union nut has a body and a pressing member. The inner sleeve has a through hole serving as a channel. The inner protrusion extends from the cylinder to an axial direction to contact the inner sleeve. The inner protrusion has a through hole serving as another channel connected with the inner sleeve's channel. The tip of the inner protrusion has an inner diameter not less than the minimum inner diameter of the inner sleeve. An inner peripheral surface is located at the inner periphery of the
(Continued)

inner protrusion and causes it to reduce in inner diameter toward another axial direction.

4 Claims, 8 Drawing Sheets

(51) Int. Cl.
  *F16L 33/22* (2006.01)
  *F16L 47/04* (2006.01)
(58) Field of Classification Search
  CPC ....... F16L 19/0283; F16L 19/05; F16L 47/04; F16L 19/043
  USPC ............. 285/382.5, 357, 353, 354, 384, 385
  See application file for complete search history.

(56) References Cited

U.S. PATENT DOCUMENTS

| | | | |
|---|---|---|---|
| 6,435,568 | B1 | 8/2002 | Fukano et al. |
| 6,896,299 | B1* | 5/2005 | Nishio .................. F16L 33/223 285/331 |
| 8,444,188 | B2* | 5/2013 | Pucciani |
| 2005/0229982 | A1* | 10/2005 | Gonzales |
| 2006/0157975 | A1* | 7/2006 | Fujii ..................... F16L 19/028 |
| 2013/0307265 | A1 | 11/2013 | Sekino |
| 2015/0176744 | A1* | 6/2015 | Glassman |
| 2016/0076686 | A1 | 3/2016 | Fujii et al. |
| 2017/0159854 | A1 | 6/2017 | Fujii et al. |

FOREIGN PATENT DOCUMENTS

| | | |
|---|---|---|
| JP | 2013-100876 A | 5/2013 |
| JP | 2014-219052 A | 11/2014 |
| KR | 10-2017-0002576 A | 1/2017 |
| WO | WO 2012/105525 A1 | 8/2012 |
| WO | WO 2014/013989 A1 | 1/2014 |
| WO | WO 2014/181591 A1 | 11/2014 |

OTHER PUBLICATIONS

Korean Office Action dated May 26, 2020 in Korean Patent Application No. 10-2019-7021588 (with English language translation), citing documents AO-AP therein, 8 pages.

* cited by examiner

RESIN TUBE FITTING

TECHNICAL FIELD

The invention relates to resin tube fittings.

BACKGROUND ART

A kind of resin tube fittings is known, which is used in devices in technical fields such as manufacture of semiconductors, medical devices, and drugs, food processing, and chemical industry. See, e.g., Patent Literature 1. The kind of resin tube fittings is used to connect tubes for transporting fluid such as ultrapure water and chemicals to other tubes or fluid devices. The fittings are designed to be coupled to longitudinal ends of the tubes. Each of the fittings has a fitting body, an inner ring, and a union nut.

The fitting body includes a main sleeve, an outer sleeve, an inner sleeve, a groove, and a first thread. The outer sleeve extends coaxially from the main sleeve to a first axial direction. The inner sleeve is disposed inside the outer sleeve and extends coaxially from the main sleeve to the first axial direction. The groove has the shape of a ring and is located between the outer sleeve and the inner sleeve to be open to the first axial direction. The first thread is located at an outer periphery of the outer sleeve.

The inner ring includes a cylinder, an insert, an outer protrusion, and an inner protrusion. The cylinder has an annular shape and is placed inside the outer sleeve of the fitting body. The insert has an annular shape and extends from the cylinder to the first axial direction to be pressed into the longitudinal end of the tube. The outer protrusion has an annular shape and extends from the cylinder to a second axial direction to be pressed into the groove. The inner protrusion has an annular shape and extends from the cylinder to the second axial direction to axially contact the inner sleeve. The inner protrusion is placed inside the outer protrusion to radially face the outer protrusion across the inner sleeve contacting the inner protrusion.

The union nut includes a nut body, a second thread, and a pressing member. The nut body has an annular shape. The second thread is located at an inner periphery of the nut body to be engaged with the first thread of the fitting body. The pressing member is designed to press the insert of the inner ring with the tube in between when the second thread is engaged with the first thread.

The configuration of the fitting allows the fitting body to be connected to the longitudinal end of the tube with the inner ring in between to form a radial sealing area between the groove of the fitting body and the outer protrusion of the inner ring and to form an axial sealing area between the inner sleeve of the fitting body and the inner protrusion of the inner ring. In the radial sealing area, a sealing force acts in a radial direction. In the axial sealing area, another sealing force acts in an axial direction. Thus, the fitting is coupled to the longitudinal end of the tube.

CITATION LIST

Patent Literature

[Patent Literature 1]
Japanese Unexamined Patent Application Publication No. 2013-100876 A

SUMMARY OF INVENTION

The union nut of a known resin tube fitting, when being used to connect the fitting body to a longitudinal end of a tube, presses the outer protrusion of the inner ring into the groove of the fitting body to form a sealing area. Accordingly, the outer protrusion presses the inner sleeve radially inward. Since the inner protrusion contacts the inner sleeve to form another sealing area, the inner sleeve presses the inner protrusion radially inward.

This causes a portion of the inner protrusion to bulge into the fluid channel, which is disposed radially inside of the inner protrusion. The portion blocks fluid flows between the fitting body and the inner ring to make fluid stagnant at the boundary therebetween. This can form backwaters in the fluid flows. The backwaters can lead to problems, for example, causing fluid components to precipitate and solidify into particles, and increasing time spent in flushing of the tube.

In view of the above-mentioned problems, the invention aims to provide a resin tube fitting that can prevent backwaters of fluid flows between its fitting body and inner ring.

A resin tube fitting according to an aspect of the invention is connectable with a longitudinal end of a tube. The fitting comprises a fitting body, an inner ring, and a union nut. The fitting body includes a main sleeve, an outer sleeve, an inner sleeve, a groove, and a first thread. The outer sleeve extends coaxially from the main sleeve to a first axial direction. The inner sleeve is disposed inside the outer sleeve and extends coaxially from the main sleeve to the first axial direction. The groove is surrounded by the main sleeve, the outer sleeve, and the inner sleeve to be open to the first axial direction. The first thread is located at an outer periphery of the outer sleeve. The inner ring includes an annular cylinder, an annular insert, an annular outer protrusion, and an annular inner protrusion. The cylinder is placed inside the outer sleeve. The insert extends from the cylinder to the first axial direction to be pressed into the longitudinal end of the tube. The outer protrusion extends from the cylinder to a second axial direction to be pressed into the groove. The inner protrusion extends from the cylinder to the second axial direction to axially contact the inner sleeve. The inner protrusion is placed inside the outer protrusion to radially face the outer protrusion across the inner sleeve contacting the inner protrusion. The inner protrusion has an inner periphery, a tip end, and a first inner peripheral surface. The inner periphery forms a wall of a fluid channel together with an inner periphery of the inner sleeve when the inner protrusion contacts the inner sleeve. The tip end has an inner diameter not less than the minimum inner diameter of the inner sleeve. The first inner peripheral surface is located at the inner periphery of the inner protrusion and causes the inner protrusion to reduce in inner diameter toward the first axial direction. The union nut includes an annular nut body, a second thread, and a pressing member. The second thread is located at an inner periphery of the nut body to be engaged with the first thread of the fitting body. The pressing member presses the tube, inside which the insert of the inner ring is placed, against the insert when the second thread is engaged with the first thread.

The outer protrusion of the inner ring, when being pressed into the groove of the fitting body, presses the inner sleeve of the fitting body radially inward. Since the inner sleeve is placed between the outer protrusion and the inner protrusion, the inner sleeve presses the inner protrusion radially inward to deform it and displace its inner peripheral surface radially inward. Since the inner peripheral surface has the above-mentioned shape, the inner protrusion does not deform to bulge into the fluid channel. There are no obstructions in the fluid channel to block fluid flows between the fitting body and the inner ring, and thus, fluid smoothly flows through the fluid channel. In this manner, the invention prevents backwaters of fluid flows between the fitting body and the inner ring.

The first inner peripheral surface may be a tapered face.

The first inner peripheral surface may be a curved face convex to the radial inside of the inner ring.

Since having the above-mentioned shape, the inner peripheral surface of the inner protrusion can be deformed into a smoother surface when the outer protrusion of the inner ring is pressed into the groove of the fitting body. The smoother surface enables the fluid channel inside the inner protrusion to have a constant cross-section area with more precision. This can improve the smoothness of fluid flows through the fluid channel of the inner ring.

The insert of the inner ring may include a slope in an outer periphery of the tip end of the insert and second and third inner peripheral surfaces in an inner periphery of the tip end of the insert. The slope reduces in outer diameter toward the first axial direction. The slope receives the pressing member with the tube in between when the second thread is engaged with the first thread. Both the second and third inner peripheral surfaces cause the tip end of the insert to reduce in inner diameter toward the second axial direction. The third inner peripheral surface is lower angled than the second inner peripheral surface. The third inner peripheral surface is dislocated from the second inner peripheral surface to the second axial direction and located at a smaller radius than the slope.

When the second thread of the union nut is engaged with the first thread of the fitting body, the pressing member of the union nut presses the slope of the insert of the inner ring with the tube in between. At the slope, the pressing force from the pressing member has a component parallel to the slope and a component perpendicular to the slope. These components deform the tip end of the insert such that the second and third inner peripheral surfaces move to the radial inside of the inner ring. The above-mentioned shapes of the second and third inner peripheral surfaces prevent the tip end of the insert from bulging into the fluid channel of the inner ring. Since there are no obstructions to fluid flows in the fluid channel between the tube and the inner ring, the flows are surely smooth, and thus no backwaters of the flows appear between the tube and the inner ring.

The invention surely provides a resin tube fitting that can prevent backwaters of fluid flows between its fitting body and inner ring.

DESCRIPTION OF EMBODIMENTS

The following describes embodiments of the invention with reference to the drawings.

Figure 1:
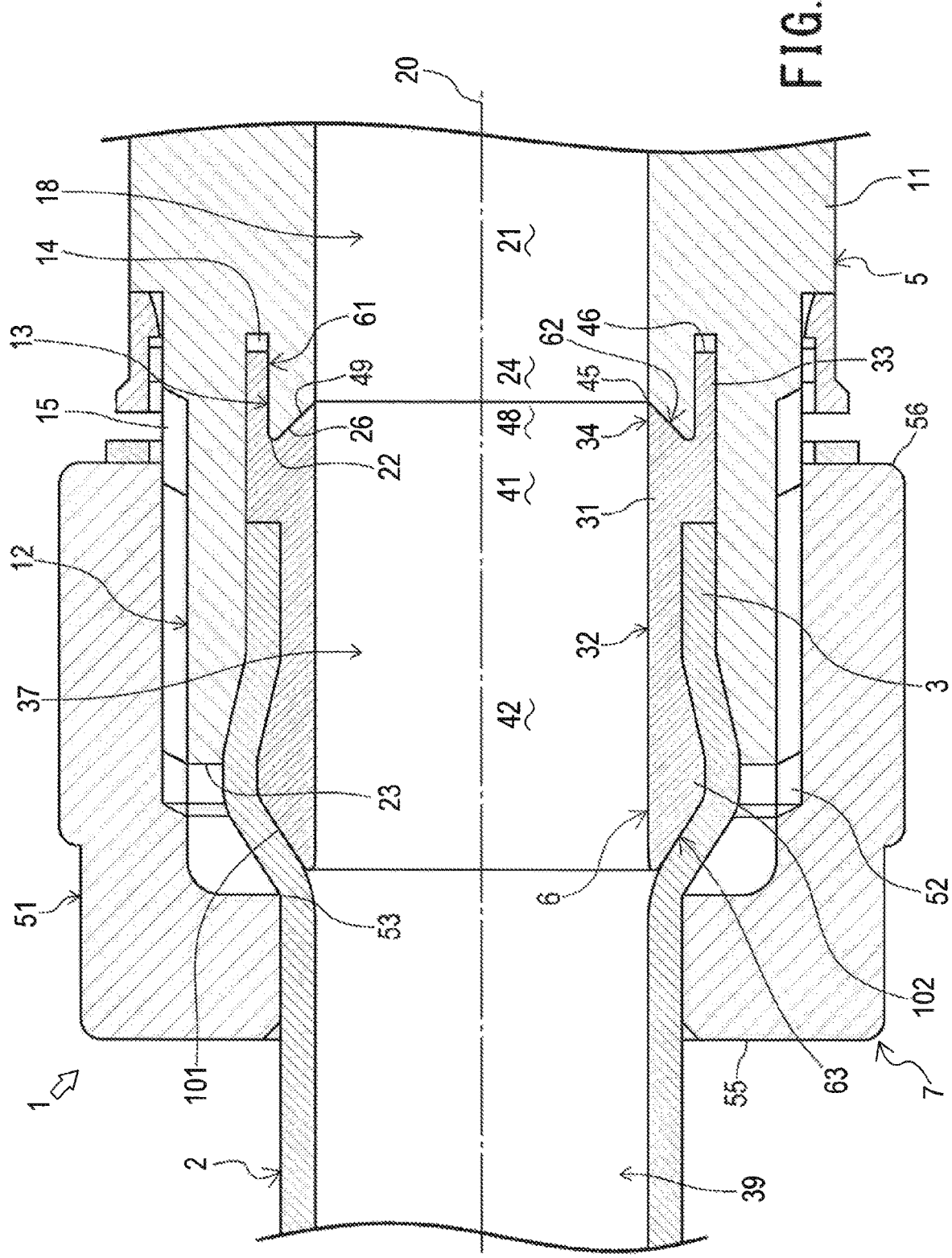
FIG. 1 is a cross-sectional view of a resin tube fitting according to an embodiment of the invention with a longitudinal end of a tube coupled to the fitting.

FIG. 1 is a cross-sectional view of a resin tube fitting 1 according to a first embodiment of the invention with a longitudinal end 3 of a tube 2 coupled to the fitting 1.

The resin tube fitting 1 can be coupled to the longitudinal end 3 of the tube 2 to connect the tube with another tube or a fluid device such as a valve or a pump. The tube 2 is used to transport fluid such as ultrapure water and chemicals. As shown in FIG. 1, the fitting 1 is coupled to the longitudinal end 3 of the tube 2.

The resin tube fitting 1 includes a fitting body 5, an inner ring 6, and a union nut 7. The tube 2 is a flexible annular member made from certain resin, which includes, for example, fluoropolymer such as tetrafluoroethylene-perfluoroalkylvinylether copolymer (PFA) or polytetrafluoroethylene (PTFE).

The fitting body 5 includes a main sleeve 11, an outer sleeve 12, an inner sleeve 13, a groove 14, and a first thread 15. The fitting body 5 also has a fluid channel 18 to transport fluid. For example, the fitting body 5 has an annular shape with a through hole serving as the fluid channel 18 extending along the axial direction of the fitting body 5.

The fitting body 5 is made from a certain resin, which includes, for example, fluoropolymer such as PFA, PTFE, polyvinylidene fluoride (PVDF), ethylene-tetrafluoroethylene copolymer (ETFE), or tetrafluoroethylene-hexafluoropropylene copolymer (FEP). The fitting body 5 (or the main sleeve 11) is coaxial with the axis 20 of the resin tube fitting 1.

The main sleeve 11 has a first fluid channel 21, which is included in the fluid channel 18 of the fitting body 5. The first fluid channel 21 extends along the axial direction of the fitting body 5 (or the main sleeve 11). The main sleeve 11 has an annular shape with its through hole with approximately constant diameters, which serves as the first fluid channel 21.

The outer sleeve 12 has an annular shape coaxial with the main sleeve 11 and extends from the main sleeve 11 to a first axial direction. The outer sleeve 12 has an inlet open to the first axial direction. The outer sleeve 12 also has a through hole that allows the inner ring 6 and the longitudinal end 3 of the tube 2, in which the inner ring 6 is placed, to enter the inlet. The shape of the outer sleeve 12 is, for example, a circular cylinder.

The inner sleeve 13 has an annular shape coaxial with the main sleeve 11, is placed radially inside the outer sleeve 12, and extends from the main sleeve 11 to the first axial direction. The inner sleeve 13 is located at a first axial end of the main sleeve 11 to position its tip end (or the first axial end) 22 on a second axial side of the tip end (or the first axial end) 23 of the outer sleeve 12.

For example, the shape of the inner sleeve 13 is a circular cylinder. The inner sleeve 13 has the minimum inner diameter D0 approximately equal to the inner diameter of the main sleeve 11 (cf. FIG. 2). The inner sleeve 13 has a constant outer diameter. The inner sleeve 13 is separated from the outer sleeve 12 radially inward. The inner sleeve 13 is approximately parallel to the outer sleeve 12.

The inner sleeve 13 has a second fluid channel 24, which is included in the fluid channel 18 of the fitting body 5. The second fluid channel 24 consists of the through hole of the inner sleeve 13 with approximately constant diameters and extends along the axial direction of the fitting body 5 (or the inner sleeve 13). The second fluid channel 24 has almost the same cross-sectional area as the first fluid channel 21 and is continuously connected with the first fluid channel 21.

The inner sleeve 13 has a first sealing face 26, an annular tapered face throughout the entirety of the inner periphery of the tip end 22 of the inner sleeve 13. The first sealing face 26 causes the tip end 22 to reduce in inner diameter to the second axial direction, i.e. toward the main sleeve 11.

The groove 14 is an annular groove surrounded by the main sleeve 11, the outer sleeve 12, and the inner sleeve 13 to be open to the first axial direction of the main sleeve 11. The groove 14 has approximately constant widths in the radial direction of the outer sleeve 12 and the inner sleeve 13. The radial widths of the groove 14 are smaller than the radial widths of an outer protrusion 33 of the inner ring 6 described later.

The first thread 15, which is an external thread, for example, is disposed at an outer periphery of the outer sleeve 12 and extends along the axial direction of the outer sleeve 12.

The inner ring 6 has a cylinder 31, an insert 32, an outer protrusion 33, and an inner protrusion 34. The inner ring 6 also has a ring hole 40 serving as a fluid channel 37 for transporting fluid. The fluid channel 37 extends along the axial direction of the inner ring 6.

The inner ring 6 is designed so that its fluid channel 37 is continuously connected with the fluid channel 18 of the fitting body 5 and the fluid channel 39 of the tube 2. The inner ring 6 is made from certain resin, which includes, for example, fluoropolymer such as PFA, PVDF, ETFE, FEP, or PTFE. The inner diameters of the inner ring 6 (or the diameters of the ring hole 40) are approximately constant except for both axial ends of the inner ring 6.

The cylinder 31 has an annular shape and fits the inside of the outer sleeve 12 of the fitting body 5. The cylinder 31 has a shape fitting the inner periphery of the outer sleeve 12, for example, a circular cylinder. The cylinder 31 has an outer diameter almost the same as the inner diameter of the outer sleeve 12 to contact the inner periphery of the outer sleeve 12 when the cylinder 31 is placed inside the outer sleeve 12.

The cylinder 31 has a third fluid channel 41, which is included in the fluid channel 37 of the inner ring 6. The third fluid channel 41 consists of the through hole of the cylinder 31, which is referred to as a ring hole 40, and extends along the axial direction of the inner ring 6 (or the cylinder 31). The third fluid channel 41 has approximately constant cross-sectional areas.

The insert 32 has an annular shape and extends from the cylinder 31 to the first axial direction of the inner ring 6 to be pressed into the longitudinal end 3 of the tube 2. The insert 32 has a circular cylinder with outer and inner diameters varying with location. The insert 32 has inner diameters almost the same as the inner diameter of the cylinder 31 and the inner diameter of the tube 2. The insert 32 has outer diameters larger than the inner diameter of the tube 2.

The insert 32 has a fourth fluid channel 42, which is included in the fluid channel 37 of the inner ring 6. The fourth fluid channel 42 consists of the through hole of the insert 32 (i.e. the ring hole 40) and extends along the axial direction of the inner ring 6 (or the insert 32). The fourth fluid channel 42 has a cross-sectional area almost the same as the third fluid channel 41 and is continuously connected with the third fluid channel 41.

The fourth fluid channel 42 is coaxial with the third fluid channel 41 and coaxially connected to the fluid channel 39 of the tube 2. The cross-sectional area of the fourth fluid channel 42 is almost the same as that of the fluid channel 39 of the tube 2.

The outer protrusion 33 has an annular shape and extends from the cylinder 31 to the second axial direction of the inner ring 6 to be pressed into the groove 14 of the fitting body 5. The outer protrusion 33 has a shape fitting the groove 14, for example, a circular cylinder. The outer protrusion 33 has a radial width larger than that of the groove 14 such that it can be pressed into the groove 14.

The outer protrusion 33 has an outer diameter equal to or larger than the inner diameter of the outer sleeve 12 of the fitting body 5 and an inner diameter smaller than the outer diameter of the inner sleeve 13 of the fitting body 5. The inner periphery of the outer protrusion 33 radially contacts the inner sleeve 13 when the outer protrusion 33 is placed inside the groove 14. The inner diameters of the outer protrusion 33 are approximately constant throughout almost the whole length of the outer protrusion 33 in the axial direction of the inner ring 6.

The inner protrusion 34 has an annular shape and extends from the cylinder 31 to the second axial direction to axially contact the inner sleeve 13 of the fitting body 5. The shape of the inner protrusion 34 is a circular cylinder with outer and inner diameters varying with location. When contacting the inner sleeve 13, the inner protrusion 34 is placed at the radial inside of the outer protrusion 33 with the inner sleeve 13 in between.

The inner protrusion 34 is located at the second axial end of the cylinder 31 to position its tip end (or its second axial end) 45 on the first axial side of the tip end (or the second axial end) 46 of the outer protrusion 33.

The inner protrusion 34 has a circular cylindrical shape and an inner diameter no less than the inner diameter of the cylinder 31 and no less than the inner diameter of the inner sleeve 13 of the fitting body 5 (except for the inner diameter of its tip end 22.) The inner protrusion 34 is coaxial with the inner sleeve 13 when the cylinder 31 is placed inside the outer sleeve 12 of the fitting body 5.

The inner protrusion 34 has a fifth fluid channel 48, which is included in the fluid channel 37 of the inner ring 6. The fifth fluid channel 48 consists of the through hole of the inner protrusion 34 (or the ring hole 40) and extends along the axial direction of the inner ring 6 (or the inner protrusion 34). The fifth fluid channel 48 has almost the same cross-sectional area as the third fluid channel 41 and is continuously connected with the third fluid channel 41.

The fifth fluid channel 48 is coaxial with the third fluid channel 41 and coaxially connected to the second fluid channel 24 of the inner sleeve 13 of the fitting body 5. The fifth fluid channel 48 has almost the same cross-sectional area as the second fluid channel 24.

The inner protrusion 34 has a second sealing face 49, which is an annular tapered face extending throughout the entirety of the outer periphery of the tip end 45 of the inner protrusion 34. The second sealing face 49 contacts the first sealing face 26. The second sealing face 49 reduces the outer diameters of the tip end 45 of the inner protrusion 34 toward the second axial direction.

The union nut 7 has a nut body 51, a second thread 52, and a pressing member 53. The union nut 7 also has an opening to enclose both the outer sleeve 12 of the fitting body 5 and the tube 2 such that the union nut 7 can move relative to them. The opening is located at the center of the union nut 7 and extends along the axial direction of the union nut 7.

The union nut 7 can move around the tube 2 in its axial direction and is attached from outside to the outer sleeve 12 of the fitting body 5. The union nut 7 is made from certain resin, which includes, for example, fluoropolymer such as PFA, PVDF, ETFE, FEP, or PTFE.

The nut body 51 has an annular shape and includes a first enclosure 55 and a second enclosure 56. The first enclosure 55 has a circular cylindrical shape to fit the tube 2 with a margin. The second enclosure 56 has a circular cylindrical shape to be tightened on the outer sleeve 12 of the fitting body 5. The second enclosure 56 extends from the first enclosure 55 coaxially to the second axial direction.

The second thread 52 is located at the inner periphery of the second enclosure 56 of the nut body 51 and extends to the axial direction of the nut body 51 to be engaged with the first thread 15 of the fitting body 5. The second thread 52 is, for example, an internal thread to be engaged with the external thread of the first thread 15.

The pressing member 53 presses the tube 2, inside which the insert 32 of the inner ring 6 is placed, against the insert 32 when the second thread 52 is engaged with the first thread 15. The pressing member 53 has a ring shape and is located at the second axial end of the inner periphery of the first enclosure 55 of the nut body 51.

The pressing member 53 includes a corner facing the radial inside of the first enclosure 55 and the second axial direction. When the second thread 52 is being engaged with the first thread 15, the pressing member 53 approaches the insert 32 of the inner ring 6 to press the longitudinal end 3 of the tube 2, inside which the insert is placed, (and also the insert 32) toward the second axial direction of the resin tube fitting 1.

Using this configuration, the resin tube fitting 1 is coupled to the longitudinal end 3 of the tube 2 in the following steps. The union nut 7 is coupled to the outer periphery of the tube 2 to be able to move relative to the tube 2 in its axial direction. Before or after that, the insert 32 of the inner ring 6 enters the longitudinal end 3 of the tube 2.

Next, the outer protrusion 33 of the inner ring 6 enters the inlet of the outer sleeve 12 of the fitting body 5. The cylinder 31 of the inner ring 6 is coupled to the inside of the outer sleeve 12 so that the outer protrusion 33 is placed into the groove 14 of the fitting body 5 and the inner protrusion 34 of the inner ring 6 is disposed near the inner sleeve 13 of the fitting body 5.

Then, the second axial end of the nut body 51 of the union nut 7 is coupled to the outer periphery of the first axial end of the outer sleeve 12 of the fitting body 5 so that the second thread 52 of the union nut 7 is engaged with the first thread 15 of the fitting body 5. Finally, the union nut 7 is tightened on the fitting body 5 by being rotated about the fitting body 5 to move the second thread on the first thread 15. As a result, the resin tube fitting 1 is coupled to the longitudinal end 3 of the tube 2.

Then, two or more sealing areas are formed and prevent leakage of fluid flowing through the fluid channel of the resin tube fitting 1 (i.e. the fluid channel 18 of the fitting body 5 and the fluid channel 37 of the inner ring 6) and the fluid channel 39 of the tube 2.

The sealing areas include a first sealing area 61, a second sealing area 62, and a third sealing area 63. The first and second sealing areas 61 and 62 seal gaps between the fitting body 5 and the inner ring 6. The third sealing area 63 seals gaps between the inner ring 6 and the longitudinal end 3 of the tube 2. The first sealing area 61 is formed between the outer protrusion 33 and the groove 14 since the outer protrusion 33 is placed inside the groove 14.

The second sealing area 62 is formed between the inner sleeve 13 and the inner protrusion 34 since the second sealing face 49 of the inner protrusion 34 contacts the first sealing face 26 of the inner sleeve 13. The third sealing area 63 is formed between the insert 32 and the longitudinal end 3 of the tube 2 since the pressing member 53 of the union nut 7 presses the tube 2 against the insert 32.

Figure 2:
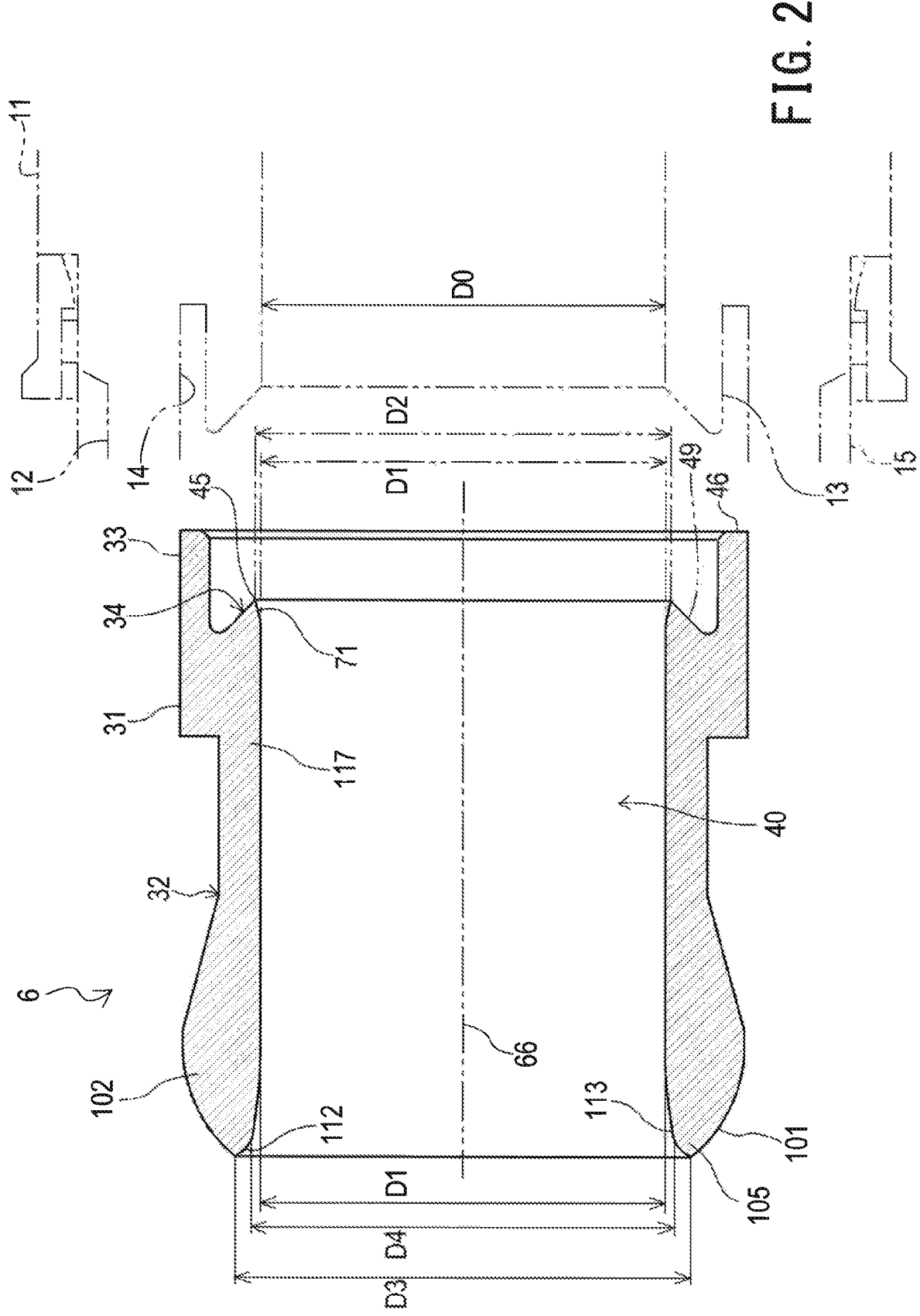
FIG. 2 is a cross-sectional view of an inner ring of the resin tube fitting of FIG. 1.
Figure 3:
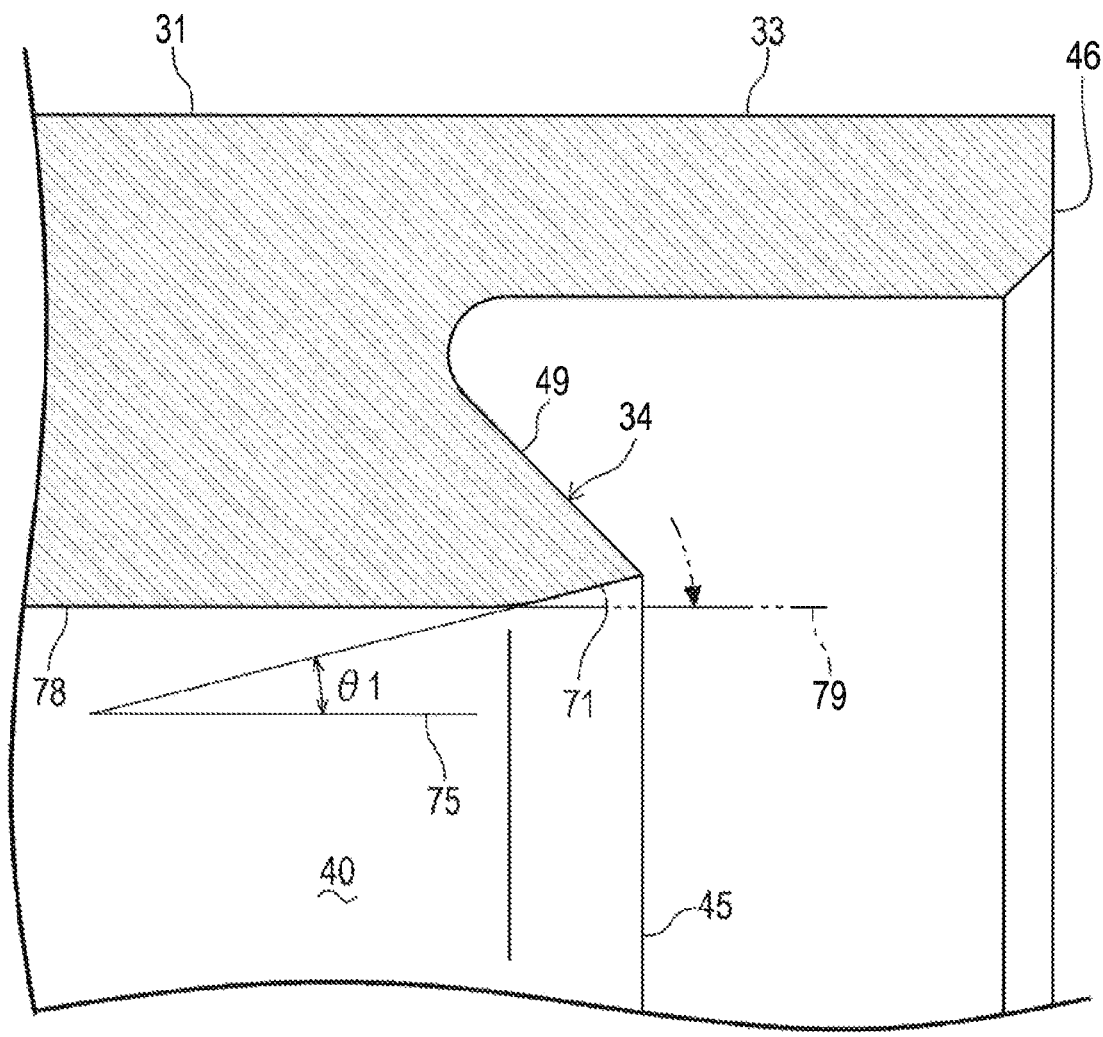
FIG. 3 is a cross-sectional view of an inner protrusion and its vicinity of the inner ring of FIG. 2.

FIG. 2 is a cross-sectional view of the inner ring 6 in the resin tube fitting 1. FIG. 3 is a cross-sectional view of the inner protrusion 34 and its vicinity of the inner ring 6 of FIG. 2.

The inner periphery of the inner sleeve 13 of the fitting body 5 and the inner periphery of the inner protrusion 34 of the inner ring 6 serve as walls of the fluid channels connected with each other when the inner protrusion 34 contacts the inner sleeve 13. The inner periphery of the inner sleeve 13 of the fitting body 5 serves as walls of the second fluid channel 24 and the inner periphery of the inner protrusion 34 of the inner ring 6 serves as walls of the fifth fluid channel 48.

As shown in FIG. 2, the tip end 45 of the inner protrusion 34 has an inner diameter no less than the minimum inner diameter D0 of the inner sleeve 13 of the fitting body 5. As shown in FIGS. 2 and 3, a first inner peripheral surface 71 is located at the inner periphery of the inner protrusion 34. The first inner peripheral surface 71 causes the inner protrusion 34 to reduce in inner diameter toward the first axial direction, i.e. portions of the inner protrusion 34 have larger inner diameters in order from the nearest to the tip end 45 to the nearest to the cylinder 31.

For example, the first inner peripheral surface 71 serves as a wall surface of the fifth fluid channel 48 and has an annular shape extending throughout the entirety of the inner periphery of the inner protrusion 34 to enclose the ring hole 40 of the inner ring 6. On the second axial side of the inner periphery of the inner protrusion 34, the first inner peripheral surface 71 is located near the tip end 45 to increase in inner diameter toward the tip end 45 in the axial direction of the inner protrusion 34 (or the inner ring 6).

The first inner peripheral surface 71 is a tapered face and is inclined at a certain angle θ1 with respect to a virtual line 75 parallel to the axis 66 of the inner ring 6 in a cross section including the axis 66 (cf. FIGS. 2 and 3.) The inner protrusion 34 has the maximum inner diameter D2 on the second axial side (near the tip end 45) and the minimum inner diameter D1 on the first axial side.

The maximum inner diameter D2 corresponds to the inner diameter of the tip end 45 of the inner protrusion 34 and is larger than the minimum inner diameter D0 of the inner sleeve 13. Thus, the tip end 45 faces a radially intermediate area of the first sealing face 26 when the outer protrusion 33 enters the inlet of the outer sleeve 12 of the fitting body 5.

For example, the inner sleeve 13 of the fitting body 5, which is connected with the inner protrusion 34, has the minimum inner diameter D0 almost equal to the minimum inner diameter D1 of the inner protrusion 34. This is not a limited condition for the minimum inner diameter D1 of the inner protrusion 34 and the minimum inner diameter D0 of the inner sleeve 13. The minimum inner diameter D1 of the inner protrusion 34 may be larger or smaller than the minimum inner diameter D0 of the inner sleeve 13 as long as the difference between the minimum inner diameters D0 and D1 does not block the fluid flows.

When the first inner peripheral surface 71 is a linearly tapered face, the boundary between the first inner peripheral surface 71 and another adjacent inner peripheral surface on the first axial side is smoothly rounded.

The inner protrusion 34 is flexible and deformable to move the tip end 45 radially inward with respect to the boundary between the inner protrusion 34 and the cylinder 31, i.e. to reduce the angle θ1. Preferably, the first inner peripheral surface 71 is located on an extension 79 of the inner peripheral surface 78 of the cylinder 31, i.e. the angle θ1 is equal to zero degrees.

Figure 4A:
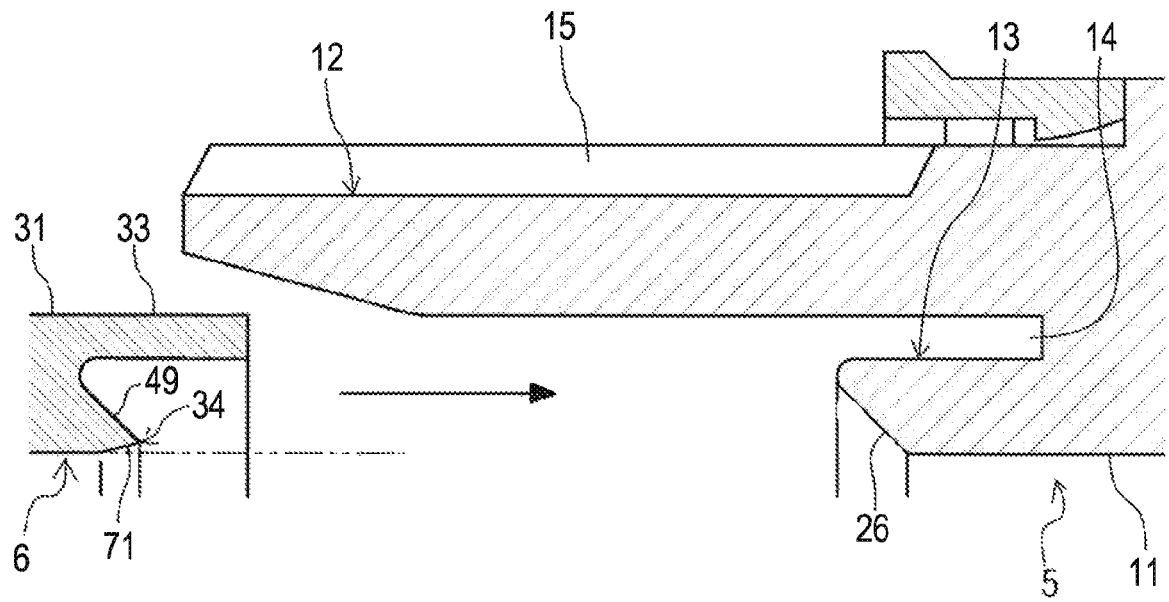
FIGS. 4A and 4B are cross-sectional views of a body and the inner ring of the resin tube fitting of FIG. 1 before and after the fitting is coupled to the longitudinal end of the tube, respectively.
Figure 4B:
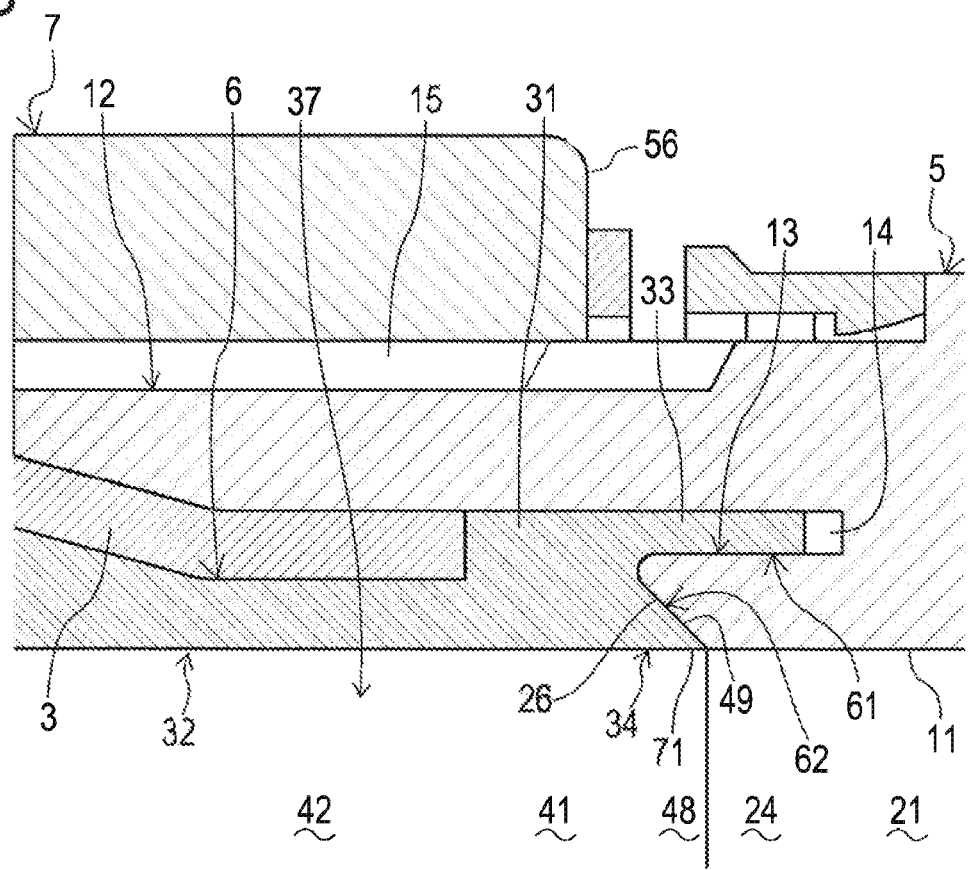

When the outer protrusion 33 of the inner ring 6 moves from a position separated from the fitting body 5 as shown in FIG. 4A to a position inside the groove 14 of the fitting body 5 as shown in FIG. 4B, the outer protrusion 33 presses the inner sleeve 13 of the fitting body 5 radially inward. Since the inner sleeve 13 is located radially between the outer protrusion 33 and the inner protrusion 34, the inner sleeve 13 presses the inner protrusion 34 radially inward.

Thus, the inner protrusion 34 is deformed to move the inner peripheral surface 71 radially inward and deform it from a shape increasing in diameter toward the tip end 45 to a shape parallel to the axial direction. In the other words, the first inner peripheral surface 71 causing the inner protrusion 34 to reduce in inner diameter toward the second axial direction prevents the inner protrusion 34 from bulging into the fluid channel 37 of the inner ring 6 (or the fifth fluid channel 48).

When the resin tube fitting 1 is coupled to the longitudinal end 3 of the tube 2, there are no obstructions to fluid flows between the fitting body 5 and the inner ring 6, and thus, the flows are surely smooth and include no backwaters.

Figure 5:
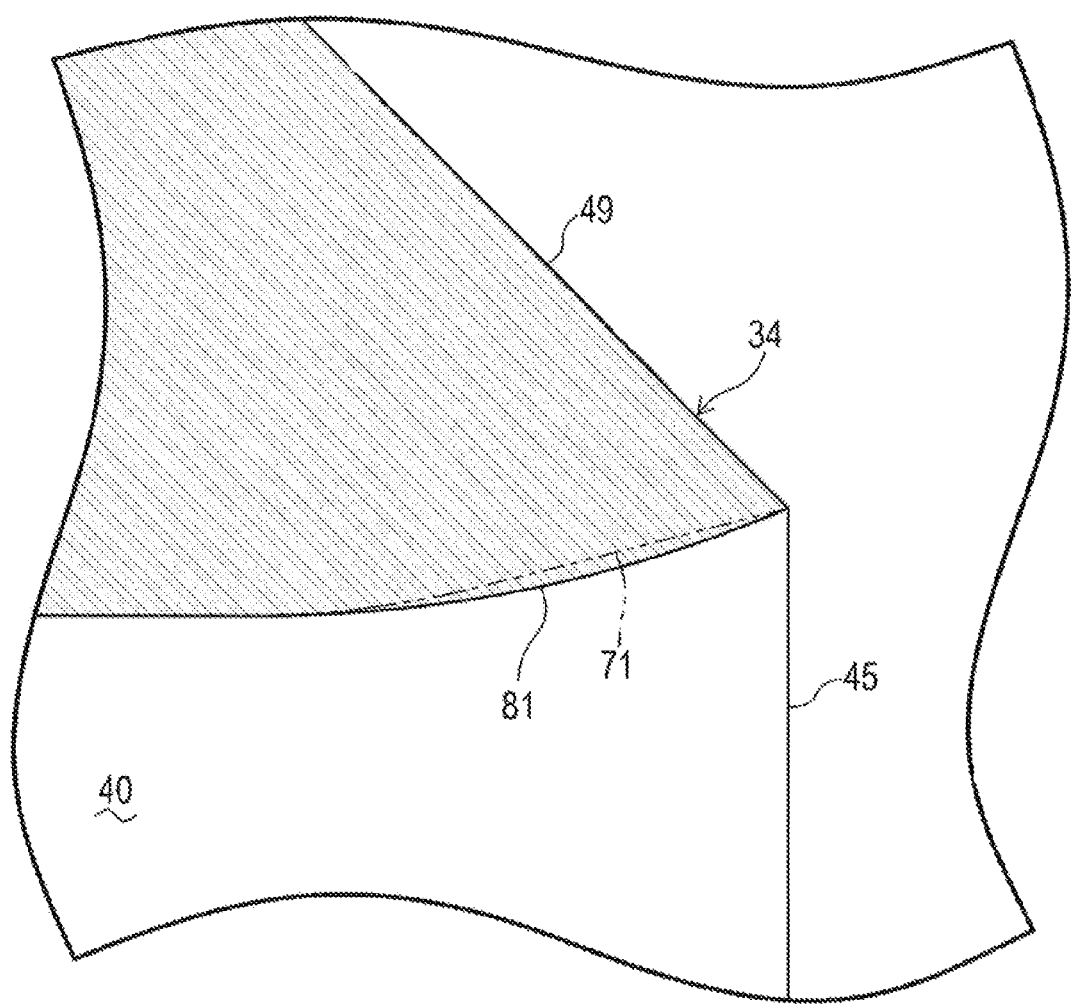
FIG. 5 is a partially enlarged view of the inner ring with an inner protrusion according to another embodiment of the invention.

The inner protrusion 34 of the inner ring 6 according to the invention is not limited to have the first inner peripheral surface 71, which is a tapered face. For example, the inner protrusion 34 may have another first inner peripheral surface 81 shown in FIG. 5. The first inner peripheral surface 81 is a curved face convex to the radial inside of the inner ring 6 in a cross section including the axis 66 of the inner ring 6.

When the outer protrusion 33 of the inner ring 6 is placed inside the groove 14 of the fitting body 5, the first inner peripheral surface 81 can be deformed into a shape smoother than the first inner peripheral surface 71; the first inner peripheral surface 81 can maintain the cross-sectional areas of the fifth fluid channel 48 of the inner protrusion 34 constant with more precision than the first inner peripheral surface 71. This improves the smoothness of fluid flows in the fluid channel 37 of the inner ring 6.

The inner protrusion of the inner ring according to the invention is not limited to have the first inner peripheral surface 71, which is located on the second axial side (near the tip end 45) of the inner periphery of the inner protrusion 34. For example, the inner protrusion 34 may have an inner peripheral surface extending along the axial direction of the inner protrusion 34 throughout almost the entirety of the inner periphery of the inner protrusion 34.

The inner protrusion of the inner ring according to the invention is not limited to have the first inner peripheral surface 71, which is inclined solely at the angle 81. For example, the first inner peripheral surface may have two or more portions that are inclined at different angles (with respect to the axis).

As shown in FIGS. 1 and 2, the insert 32 of the inner ring 6 has a slope 101, which receives the pressing member 53 of the union nut 7 with the tube 2 in between when the second thread 52 of the union nut 7 is engaged with the first thread 15 of the fitting body 5. The slope 101 is included in a swell 102 of the insert 32, which is convex to the radial outside.

The slope 101 is located at the outer periphery of the tip end (or the first axial end) 105 of the insert 32 and reduces in outer diameter from the cylinder 31 toward the first axial direction. The slope 101 enlarges the outer diameter of the inner periphery of the longitudinal end 3 of the tube 2. The slope 101 has a ring shape extending throughout the entirety of the outer periphery of the insert 32.

The slope 101 is a tapered or convex face inclined at a certain angle with respect to the axis 66 of the inner ring 6 or curved to have a certain radius of curvature. Since the slope 101 receives the pressing member 53 of the union nut 7 moving in the axial direction of the resin tube fitting 1, the force from the pressing member 53 has an axial component and a radial component.

Figure 6:
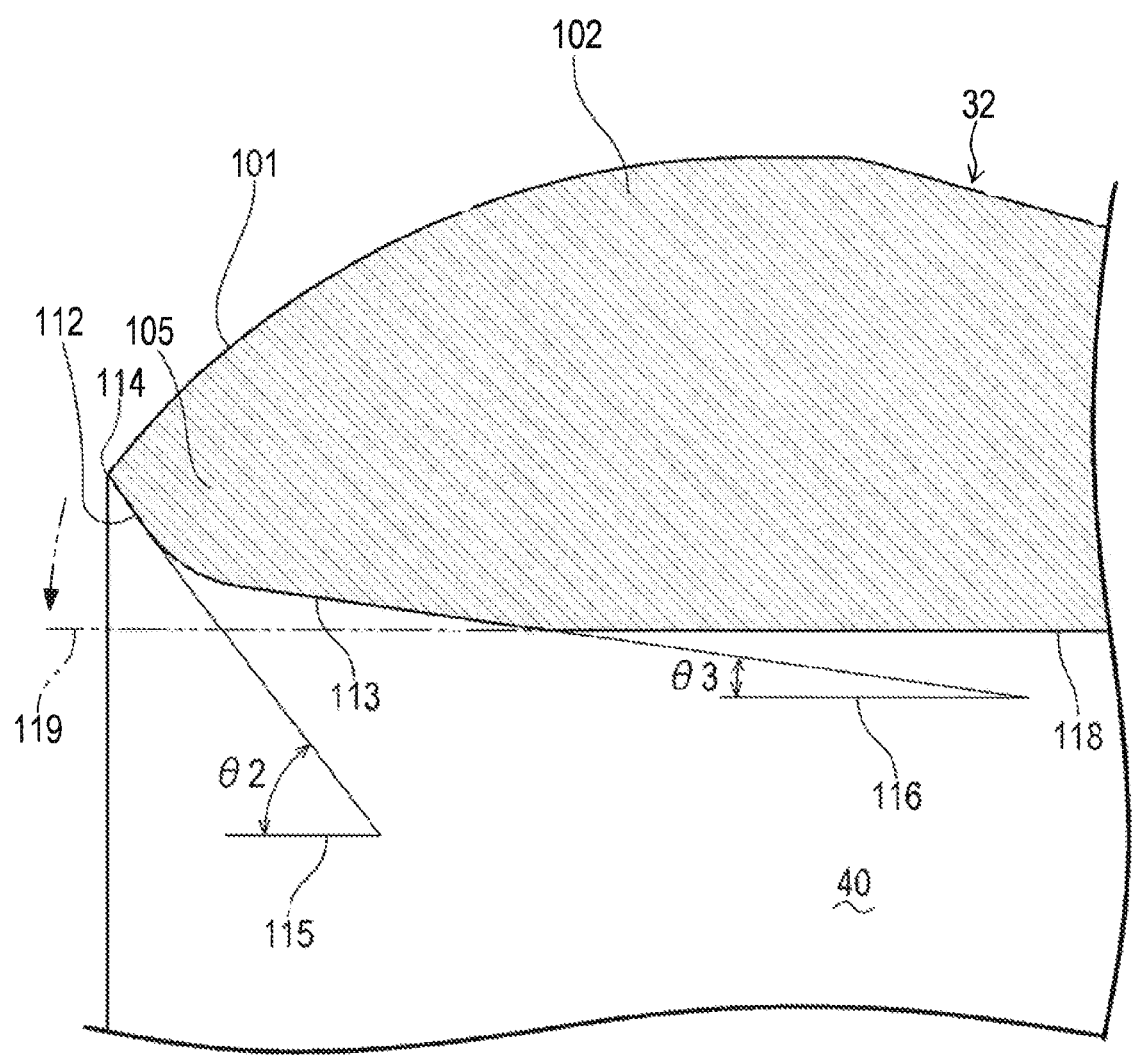
FIG. 6 is a cross-sectional view of an insert and its vicinity of the inner ring of FIG. 2.

FIG. 6 is a cross-sectional view of the insert 32 and its vicinity of the inner ring 6 of FIG. 2.

As shown in FIGS. 2 and 6, the insert 32 of the inner ring 6 has a second inner peripheral surface 112 and a third inner peripheral surface 113. The second inner peripheral surface 112 is located at the inner periphery of the tip end 105 of the insert 32 and causes the tip end 105 to reduce in inner diameter toward the second axial direction, i.e. toward the cylinder 31.

The second inner peripheral surface 112 has a ring shape extending throughout the entirety of the inner periphery of the tip end 105 to enclose the ring hole 40 of the inner ring 6. On the first axial side of the inner periphery of the tip end 105, the second inner peripheral surface 112 is located near the tip end 105 to increase in inner diameter toward the leading end 114 in the axial direction of the insert 32 (or the inner ring 6).

The second inner peripheral surface 112 is a tapered face and inclined at a certain angle θ2 with respect to a virtual line 115 parallel to the axis 66 of the inner ring 6 in a cross section including the axis 66 (cf. FIGS. 2 and 6.) A portion of the tip end 105 including the second inner peripheral surface 112 has the maximum inner diameter D3 on the first axial side and the minimum inner diameter D4 on the second axial side, i.e. near the third inner peripheral surface 113.

The third inner peripheral surface 113 is located at the inner periphery of the tip end 105 of the insert 32 and causes the tip end 105 to reduce in inner diameter toward the second axial direction, i.e. toward the cylinder 31. As shown in FIG. 6, the third inner peripheral surface 113 is lower angled than the second inner peripheral surface 112, dislocated from the second inner peripheral surface 112 to the second axial direction, and located at a smaller radius than the slope 101.

The third inner peripheral surface 113 has a ring shape extending throughout the entirety of the inner periphery of the tip end 105 to enclose the ring hole 40 of the inner ring 6. On the second axial side of the inner periphery of the tip end 105, i.e. near the cylinder 31, the third inner peripheral surface 113 is located away from the tip end 105 to increase in inner diameter toward the leading end 114 in the axial direction of the insert 32 (or the inner ring 6).

The third inner peripheral surface 113 is a tapered face and inclined at a certain angle θ3 with respect to a virtual line 116 parallel to the axis 66 of the inner ring 6 in a cross section including the axis 66 (cf. FIGS. 2 and 6.) A portion of the tip end 105 including the third inner peripheral surface 113 has the maximum inner diameter D4 on the first axial side and the minimum inner diameter D1 on the second axial side.

The third inner peripheral surface 113 is adjacent to the second axial side of the second inner peripheral surface 112. When the second inner peripheral surface 112 and the third inner peripheral surface 113 are linearly tapered faces, the boundary between the second inner peripheral surface 112 and the third inner peripheral surface 113 and the boundary between the third inner peripheral surface 113 and another adjacent inner peripheral surface are smoothly rounded.

The tip end 105 is flexible and deformable to move radially inward with respect to the base end 117 of the insert 32, i.e. to reduce the angle θ3. Preferably, the third inner peripheral surface 113 is located on an extension 119 of the inner peripheral surface 118 of the base end 117, i.e. the angle θ3 is equal to zero degrees.

The angle θ3 is smaller than angle θ2 so that the third inner peripheral surface 113 is lower angled than the second inner peripheral surface 112. In the fourth fluid channel 42, a fluid channel in a volume including the second inner peripheral surface 112 is continuously connected with a fluid channel in a volume including the third inner peripheral surface 113.

Figure 7A:
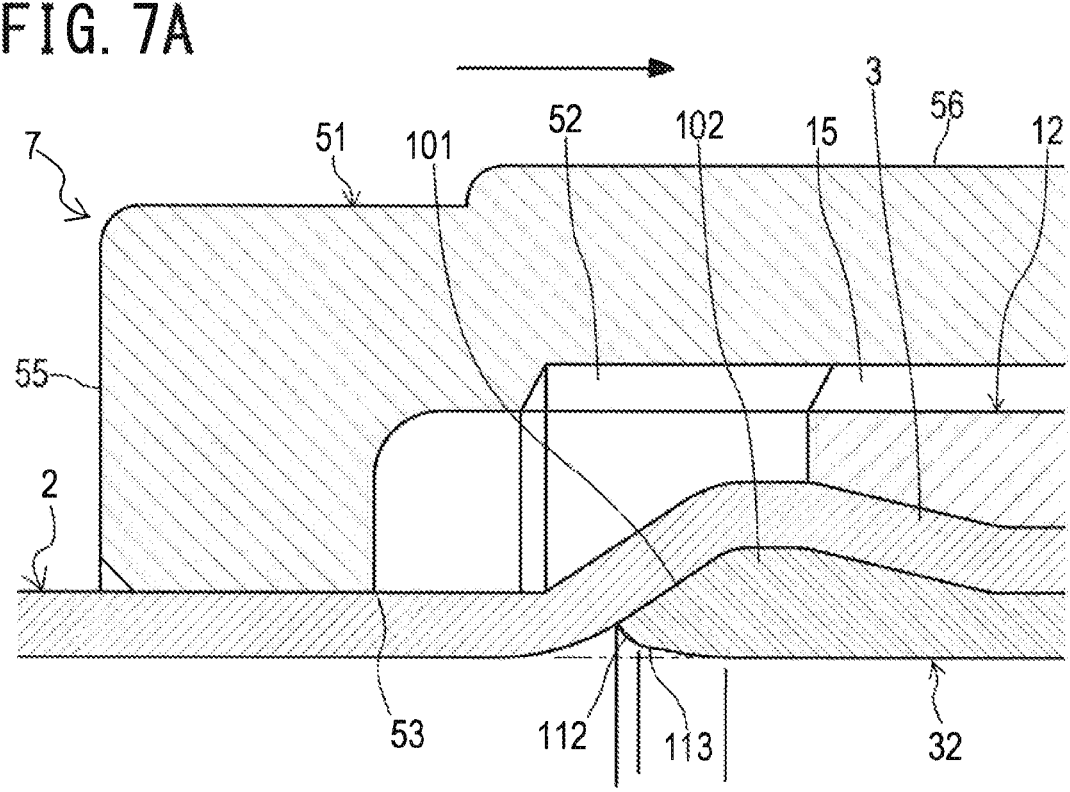
FIGS. 7A and 7B are cross-sectional views of the inner ring of the resin tube fitting of FIG. 1 and the tube before and after the fitting is coupled to the longitudinal end of the tube, respectively.
Figure 7B:
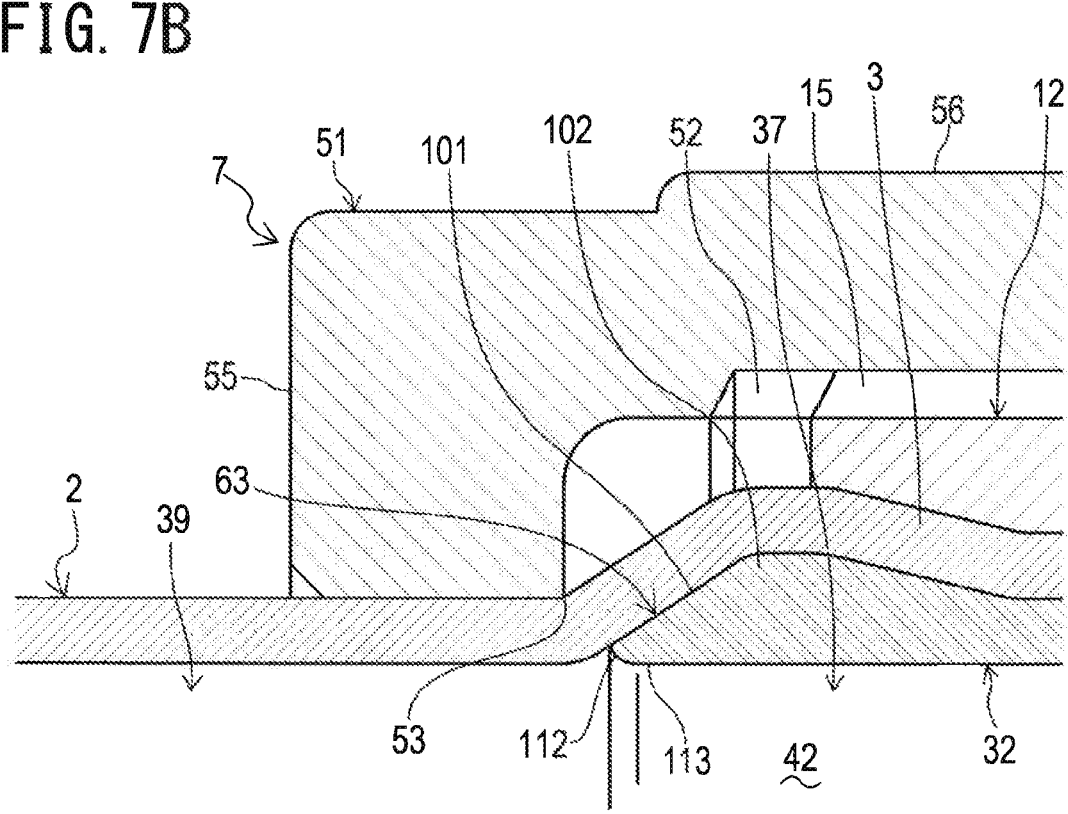

When the second thread 52 of the union nut 7, which is separated from the fitting body 5 as shown in FIG. 7A, is engaged with the first thread 15 of the fitting body 5 as shown in FIG. 7B, the pressing member 53 of the union nut 7 presses the slope 101 of the insert 32 of the inner ring 6 with the tube 2 in between. At the slope 101, the pressing force from the pressing member 53 has a component parallel to the slope 101 and a component perpendicular to the slope 101.

These components deform the tip end 105 of the insert 32 such that the second inner peripheral surface 112 and the third inner peripheral surface 113 move to the radial inside of the inner ring 6 and deform from a shape increasing in diameter toward the leading end 114 to a shape parallel to the axial direction. In the other words, the above-mentioned shapes of the second and third inner peripheral surfaces 112 and 113 prevent the tip end 105 of the insert 32 from bulging into the fluid channel 37 of the inner ring 6 (or the fourth fluid channel 42.)

Since there are no obstructions to fluid flows in the fluid channel between the tube 2 and the inner ring 6, the flows are surely smooth and include no backwaters.

Figure 8:
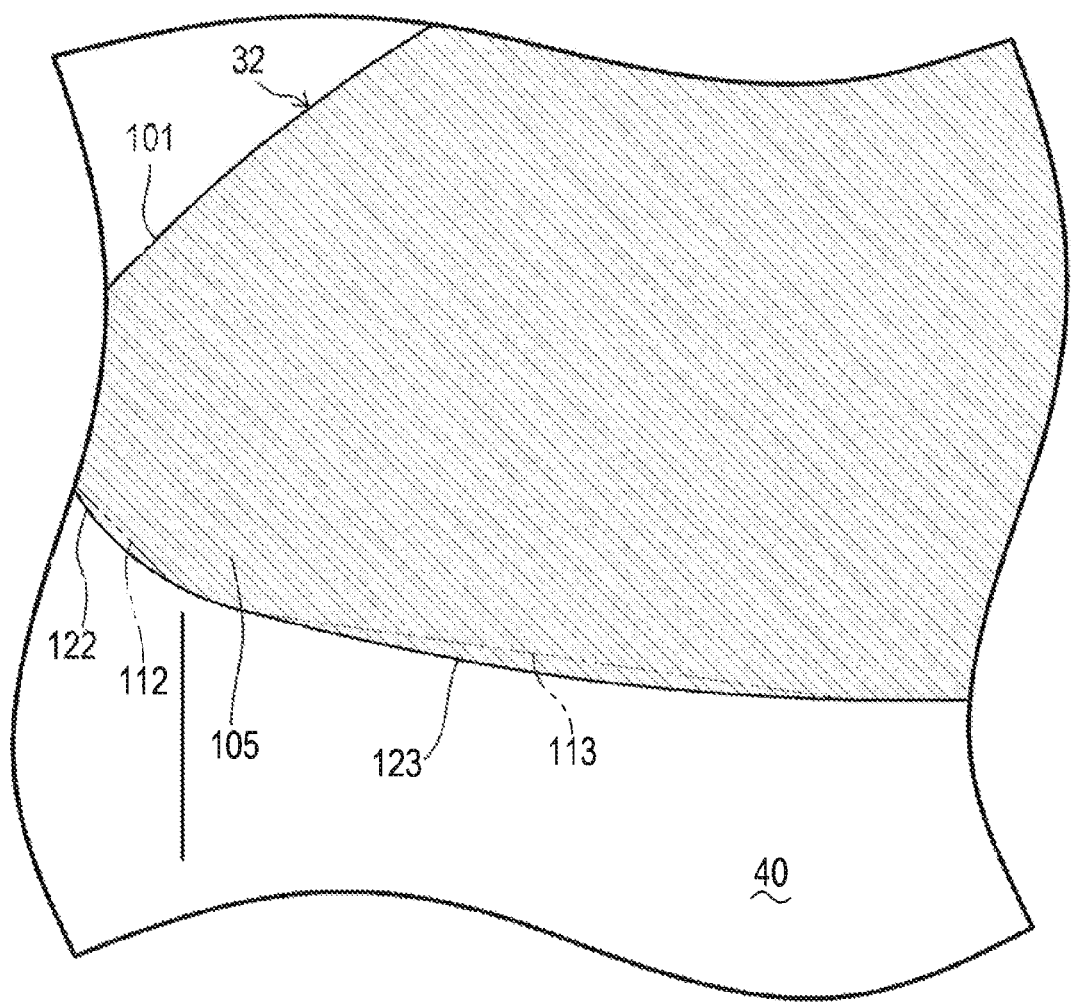
FIG. 8 is a partially enlarged view of the inner ring with the tip end of an insert according to yet another embodiment of the invention.

The tip end 105 of the insert 32 of the inner ring 6 according to the invention is not limited to have the second and third inner peripheral surfaces 112 and 113, which are tapered faces. For example, the tip end 105 may have other second and third inner peripheral surfaces 122 and 123 shown in FIG. 8. The second and third inner peripheral surfaces 122 and 123 are curved faces convex to the radial inside of the inner ring 6 in a cross section including the axis 66 of the inner ring 6.

When the union nut 7 is tightened on the fitting body 5, the second and third inner peripheral surfaces 122 and 123 can be deformed into shapes smoother than the second and third inner peripheral surfaces 112 and 113; the second and third inner peripheral surfaces 122 and 123 can maintain the cross-sectional areas of the fourth fluid channel 42 at the tip end 105 of the insert 32 constant with more precision than the second and third inner peripheral surfaces 112 and 113. This improves the smoothness of fluid flows in the fluid channel 37 of the inner ring 6.

The tip end of the insert 32 of the inner ring 6 according to the invention is not limited to have the third inner peripheral surface 113, which is inclined solely at the angle θ3. For example, the third inner peripheral surface may have two or more portions that are inclined at different angles. One of the portions may serve as the second inner peripheral surface 112.

In view of the explanation described above, the invention can obviously have variations and modifications. Accordingly, it should be understood that the invention can have embodiments other than those in the description within the scope of the claims attached to the description.

LIST OF REFERENCE SYMBOLS 1 resin tube fitting, 2 tube, 3 longitudinal end of the tube, 5 fitting body, 6 inner ring, 7 union nut, 11 main sleeve, 12 outer sleeve, 13 inner sleeve, 14 groove, 15 first thread, 31 cylinder, 32 insert, 33 outer protrusion, 34 inner protrusion, 51 nut body, 52 second thread, 53 pressing member, 71 first inner peripheral surface, 101 slope, 112 second inner peripheral surface, 113 third inner peripheral surface.

What is claimed is:

1. A resin tube fitting connectable with a longitudinal end of a tube, comprising:
a fitting body including:
a main sleeve;
an outer sleeve extending coaxially from the main sleeve to a first axial direction;
an inner sleeve disposed inside the outer sleeve and extending coaxially from the main sleeve to the first axial direction;
a groove surrounded by the main sleeve, the outer sleeve, and the inner sleeve to be open to the first axial direction; and
a first thread located at an outer periphery of the outer sleeve;
an inner ring including:
an annular cylinder placed inside the outer sleeve;
an annular insert extending from the cylinder to the first axial direction to be pressed into the longitudinal end of the tube;
an annular outer protrusion extending from the cylinder to a second axial direction to be pressed into the groove; and
an annular inner protrusion extending from the cylinder to the second axial direction to axially contact the inner sleeve, the inner protrusion placed inside the outer protrusion to radially face the outer protrusion across the inner sleeve contacting the inner protrusion, the inner protrusion having:
a tip end with an inner diameter not less than the minimum inner diameter of the inner sleeve:
an outer periphery having an annular tapered surface that causes the inner protrusion to increase in outer diameter toward the first axial direction, and that contacts the inner sleeve when the outer protrusion is pressed into the groove; and
an inner periphery configured to form a wall of a fluid channel together with an inner periphery of the inner sleeve when the tapered surface contacts the inner sleeve, the inner periphery of the inner protrusion having a first inner peripheral surface that,
when the tapered surface is separated from the inner sleeve, causes a tip portion of the inner protrusion to be axially shorter than the tapered surface to reduce in inner diameter toward the first axial direction and is lower angled than the tapered surface, and that,
when the tapered surface contacts the inner sleeve, is deformed to reduce in inclination angle; and a union nut including:
 an annular nut body;
 a second thread located at an inner periphery of the nut body to be engaged with the first thread of the fitting body; and
 a pressing member configured to press the tube, inside which the insert of the inner ring is placed, against the insert when the second thread is engaged with the first thread.

2. The resin tube fitting according to claim 1, wherein the first inner peripheral surface is a tapered face.

3. The resin tube fitting according to claim 1, wherein the first inner peripheral surface is a curved face convex to the radial inside of the inner ring.

4. The resin tube fitting according to claim 1, wherein the insert of the inner ring comprises:
 a slope in an outer periphery of a tip end of the insert, reducing in outer diameter toward the first axial direction, the slope configured to receive the pressing member across the tube when the second thread is engaged with the first thread;
 a second inner peripheral surface in an inner periphery of the tip end of the insert, causing the tip end of the insert to reduce in inner diameter toward the second axial direction; and
 a third inner peripheral surface in an inner periphery of the tip end of the insert, causing the tip end of the insert to reduce in inner diameter toward the second axial direction, the third inner peripheral surface lower angled than the second inner peripheral surface, dislocated from the second inner peripheral surface to the second axial direction, and located at a smaller radius than the slope.

* * * * *